US012706670B2

(12) United States Patent
Slater et al.

(10) Patent No.: US 12,706,670 B2
(45) Date of Patent: Aug. 11, 2026

(54) METHOD AND SYSTEM FOR DETERMINING A ROUND-TRIP LATENCY OF A QUANTUM COMMUNICATION CHANNEL

(71) Applicant: **Q*BIRD B.V.**, Delft (NL)

(72) Inventors: Joshua Alexander Slater, Vienna (AT); Remon Ciaran Berrevoets, Delft (NL); Thomas Middelburg, Delft (NL)

(73) Assignee: **Q*BIRD B.V.**, Delft (NL)

( * ) Notice: Subject to any disclaimer, the term of this patent is extended or adjusted under 35 U.S.C. 154(b) by 247 days.

(21) Appl. No.: 18/738,455

(22) Filed: Jun. 10, 2024

(65) Prior Publication Data

US 2025/0141545 A1 May 1, 2025

Related U.S. Application Data

(63) Continuation of application No. PCT/NL2022/050709, filed on Dec. 8, 2022.

(30) Foreign Application Priority Data

Dec. 8, 2021 (NL) ..................................... 2030076

(51) Int. Cl.
*H04B 10/00* (2013.01)
*H04B 10/079* (2013.01)
(Continued)

(52) U.S. Cl.
CPC ......... *H04B 10/0795* (2013.01); *H04B 10/70* (2013.01)

(58) Field of Classification Search
CPC ...................................................... H04B 10/70
See application file for complete search history.

(56) References Cited

U.S. PATENT DOCUMENTS 7,936,798 B2 5/2011 Skierbiszewski et al.
10,110,369 B2 10/2018 Grice et al.
(Continued)

FOREIGN PATENT DOCUMENTS

WO 2013143385 A1 10/2013

OTHER PUBLICATIONS

Bennett, C.H. and Brassard, G., “Quantum Cryptography: Public Key Distribution and Coin Tossing”, Proceedings of IEEE International Conference on Computers, Systems and Signal Processing, Dec. 1984, 5 pages, vol. 175-179.
(Continued)

*Primary Examiner* — Daniel G Dobson
(74) *Attorney, Agent, or Firm* — Steven M. Koehler; Westman, Champlin & Koehler, P.A.

(57) ABSTRACT

A method for determining a round-trip latency of a communication channel in a system between a first device and a second device, comprising: setting an estimated round-trip latency binary value by the first device that represents a latency measured in clock cycles; generating and sending a first test signal by the first device comprising alternating first and second values, being sent at each clock cycle; saving each first and second value of the first test signal for a duration that corresponds to the estimated latency value; receiving the first test signal at the second device; sending, by the second device, a validating signal that is based on the first test signal; receiving the validating signal at the first device; and determining if the latency value is correct based on the comparing of the validating signal and the first test signal.

20 Claims, 7 Drawing Sheets

(51) Int. Cl.
*H04B 10/70* (2013.01)
*H04J 14/00* (2006.01)

(56) References Cited

U.S. PATENT DOCUMENTS

| | | | | |
|---|---|---|---|---|
| 2007/0230509 | A1 | 10/2007 | To et al. | |
| 2011/0170584 | A1 | 7/2011 | To et al. | |
| 2017/0317814 | A1* | 11/2017 | Grice ..................... | H04B 10/70 |
| 2020/0084033 | A1 | 3/2020 | Lamas-Linares et al. | |
| 2022/0166617 | A1* | 5/2022 | Lamas-Linares ...... | H04B 10/50 |

OTHER PUBLICATIONS

Lee et al. "Absolute Clock Synchronization with a Single Time-Correlated Photon Pair Source Over 10km", Sep. 9, 2020, 5 pages, retrieved from <https://arxiv.org/pdf/2009.04815>.

Vagniluca et al, "Efficient Time-Bin Encoding for Practical High-Dimensional Quantum Key Distribution", Physical Review Applied, 2020, pp. 014051-1-014051-8, vol. 14.

International Search Report and Written Opinion in corresponding International Application No. PCT/NL2022/050709 dated Mar. 28, 2023.

* cited by examiner estimated round
trip latency
value=000
590
554
552
556
554a
Test
Validating
0 1 0 1 0 1 0 1 0 1
x x x 0 1 0 1 0 1 0 1 0 1
558
560
562
562a 592
estimated round
trip latency
value=001
566
564
568
Test
Validating
x 0 0 0 1 0 0 0 1 0 0 0 1
x x x 0 0 0 1 0 0 0 1 0 0 0 1
570
572
574

594
estimated round
trip latency
value=011
576
578
580
Test
Validating
x x x 0 0 0 0 0 0 0 1 0 0 0 0 0 0 0 1
x x x 0 0 0 0 0 0 0 1 0 0 0 0 0 0 0 1
582
584
586

METHOD AND SYSTEM FOR DETERMINING A ROUND-TRIP LATENCY OF A QUANTUM COMMUNICATION CHANNEL

CROSS-REFERENCE TO RELATED APPLICATION

This application is a Continuation Application of International Application No. PCT/NL2022/050709, filed Dec. 8, 2022 and published as WO 2023/106922 on Jun. 15, 2023, in English, and claims priority of Netherlands application NL2030076, filed Dec. 8, 2021, the contents of both are incorporated herein by reference in their entirety.

FIELD

The present disclosure relates to a method and system for determining a round-trip latency of a communication channel in a communication system between a first device located at a first location and a second device located at a second location that is remote from the first location, wherein the communication system comprises a clock unit configured to generate clock cycles, a quantum communication network comprising such a system, and a computer program configured to execute the method.

BACKGROUND

Quantum information systems are data processing systems that use a quantum system, e.g. a qubit, as an information carrier. In conventional data processing systems the basic unit of information is bits that either have the value '0' or '1'. In contrast, the basic unit of information in quantum information systems are qubits, wherein a qubit may be a two-state quantum mechanical system. The special property of a qubit is that it can be in either '0', '1', or a superposition of both states simultaneously. One example of a quantum information system wherein qubits are used is a Quantum Key Distribution (QKD) system.

QKD systems allow two or more users at different locations to securely generate cryptographic keys by at least partly making use of the special property of the qubits. The first proposal for a QKD system (BB84) was done by C. H. Bennett and G. Brassard, described in the article "Quantum cryptography: Public key distribution and coin tossing", Proceedings of IEEE International Conference on Computers, Systems and Signal Processing, volume 175, page 8. New York, 1984. An advantage of using a QKD system is that, at least in theory, the key is even secure in case an eavesdropper is present in the system.

Often QKD systems are based on lasers and field programmable gate arrays to generate time-bin qubits. Time bin qubits may be formed by a coherent superposition of two independent temporal modes of light field. Time-bin encoding is especially suitable for single-mode optical fiber propagation and compatible with already existing fiber networks. Hence, the formation of time bin qubits in QKD systems is a practical element in the development of practical QKD implementations. QKD protocols such as the above referred BB84 protocol, the coherent one-way (COW) QKD protocol and other QKD protocols such as described in the article by Vagniluca et al, Efficient time-bin encoding for practical high-dimensional quantum key distribution, physical review applied 14, 014051 (2020), may use a train of phase coherent temporal modes by intensity modulation of the output of a continuous-wave (CW) laser and subsequent attenuation. The time bin qubits may have an early, late or vacuum state.

A QKD system may comprise sender and receiver nodes. Hereafter we shall refer to a sender node as Alice and a receiver node as Bob. In some instances, the distance between Alice and Bob is not precisely known. In these situations it is not known what the value of the round-trip latency of a signal is when the signal travels from Alice to Bob and back. The round-trip latency of the signal is important for a correct working of a QKD system and more generally to a quantum communication network, as both Alice needs to know which qubit was sent resulting in a successful qubit projection measurement. Therefore, it is an object of the present disclosure to precisely determine the round-trip latency of a communication channel.

U.S. Pat. No. 10,110,369 B2 discloses a method for determining the time of flight (TOF) or latency for a communication system, which is used for clock synchronization in a quantum channel. A quantum source device generates a photon pulse and registers the time of transmission (TOT) using an external clock source. The receiver device receives the photon pulse and logs the time of arrival (TOA) by using a local clock. The receiver modulates one or more photons of the photon pulse and returns the one or more photons to the source device via the quantum channel. The source device detects the returned photons and logs a time of return (TOR). The source device may determine the TOF for photons of the photon pulse based on the time of return (TOR) and the time of transmission (TOT). The time of flight (TOF) is determined based on calculating TOR−TOT/2. The receiver device may utilize the TOF information, the TOA information and the TOT information to generate a compensation metric for the receiver clock to synchronize with the external clock source communicatively coupled to the source device.

SUMMARY

In a first aspect, the disclosure relates to a method for determining a round-trip latency of a communication channel in a communication system between a first device located at a first location and a second device located at a second location that is remote from the first location, wherein the communication system comprises a clock unit configured to generate clock cycles. The method may comprise setting an estimated round-trip latency value at the first location, wherein the estimated round-trip latency value is represented as a binary number, generating and sending, during a first period, a first test signal by the first device to the second device, wherein the first test signal comprises alternating first values and second values, wherein first and second values are sent at each clock cycle of the clock unit, saving by the first device each first and second value of the first test signal for at least a duration that corresponds to the estimated round-trip latency value, receiving the first test signal at the second device, sending, by the second device to the first device, upon receiving the first test signal, a validating signal that is generated by the second device and is based on the first test signal, wherein the validating signal comprises at least second values when second values from the first test signal are received, receiving the validating signal at the first device, comparing the validating signal with the first test signal sent during the first period, and determining if the estimated round-trip latency value is correct based on the comparing of the validating signal and the first test signal.

In an embodiment comparing the validating signal with the first test signal comprises determining, at a time of receiving a second value from the validating signal, if the first test signal that is sent at a time that is one estimated round-trip latency value earlier than the receiving of the second value of the validating signal comprises a first or second value, and comparing the determined first or second value of the first test signal with the second value of the validating signal.

In an embodiment saving by the first device each first and second value of the first test signal for at least a duration that corresponds to the estimated round-trip latency value comprises storing each first and second value from the first test signal in a shift register, wherein the shift register has a length that corresponds to the estimated round-trip latency value, and when the received validating signal comprises the second value, the method further comprises determining, upon registering that the received validating signal comprises the second value, if an output of the shift register is a first or second value, and comparing the determined first or second value of the output of the shift register with the second value of the validating signal.

In an embodiment determining if the estimated round-trip latency value is correct further comprises determining, based upon at least the second values of the validating signal corresponding to the sending of the second values of the first test signal, that a least significant bit of the estimated round-trip latency value is correct.

In an embodiment the method further comprises flipping the least significant bit of the estimated round-trip latency value if the least significant bit of the estimated round-trip latency value is incorrect.

In an embodiment the steps of comparing the validating signal with the first test signal is repeated for a predetermined number of times, wherein each time that during a determination step the second value of the validating signal corresponds to the second value of the first test signal represents a correct measurement, and wherein determining if the estimated round-trip latency value is correct further comprises determining a ratio corresponding to a number of correct measurements divided by the predetermined number of times, and determine that the least significant bit of the estimated round-trip latency value is correct if the ratio is above a predetermined threshold.

In an embodiment determining if the estimated round-trip latency value is correct determines if the estimated round-trip latency value is off by is a multiple of one clock cycle compared to an actual round-trip latency value.

In an embodiment the estimated round-trip latency value represents a latency measured in clock cycles.

In an embodiment the method further comprises generating and sending, during a second period, a second test signal by the first device to the second device, wherein the second test signal comprises first values and second values, wherein each second value is preceded by three first values.

In an embodiment determining if the estimated round-trip latency value is correct further comprises determining, based upon at least the second values of the validating signal corresponding to the sending of the second values of the first test signal, that a second-to-least significant bit of the estimated round-trip latency value is correct.

In an embodiment the method further comprises flipping the second-to-least significant bit if the second-to-least significant bit of the estimated round-trip latency value is incorrect.

In an embodiment determining if the estimated round-trip latency value is correct determines if the estimated round-trip latency value is off by a multiple of 2 clock cycles compared to an actual round-trip latency value.

In an embodiment the method further comprises generating and sending, during a third period, a third test signal by the first device to the second device, wherein the third test signal comprises first values and second values, wherein each second value is preceded by seven first values.

In an embodiment determining if the estimated round-trip latency value is correct further comprises determining, based upon at least the second values of the validating signal corresponding to the sending of the second values of the first test signal, that a third-to-least significant bit of the estimated round-trip latency value is correct.

In an embodiment the method further comprises flipping the third-to-least significant bit if the third-to-least significant bit of the estimated round-trip latency value is incorrect.

In an embodiment determining if the estimated round-trip latency value is correct determines if the estimated round-trip latency value is off by a multiple of 4 clock cycles compared to an actual round-trip latency value.

In an embodiment the method further comprises generating and sending for n=1 till N, during a n-th period, a n-th test signal by the first device to the second device, wherein the n-th test signal comprises first and second values, wherein each second value is preceded by two to the power n minus one times a first value, and repeating the generating and sending of the test signal wherein with each repetition the value of n is increased by one.

In an embodiment determining if the estimated round-trip latency value is correct determines if the estimated round-trip latency value is off by a multiple of two to the power n−1 clock cycles compared to an actual round-trip latency value.

In an embodiment the method further comprises stopping the repeating of the generating of the test signal based on the distance between the first device and second device and the speed of light.

In an embodiment the test signals and/or validating signals are optical signals, and wherein preferably the first and second values are early, late or vacuum time bin qubits.

In an embodiment the clock signal is a Manchester encoded clock signal, and preferably wherein the validating signal is encoded onto the clock signal.

In an embodiment the estimated round-trip latency value is at least partly set based on a distance between the first and second device divided by the speed of light.

In a further aspect the disclosure relates to a system for determining a round-trip latency between a first and a second location of a communication channel. The system may comprise a first electronic device that is positioned at the first location comprising a controller and a signal circuit, a second electronic device that is positioned at the second location that is remote from the first location comprising a controller and a signal circuit, a clock unit that is configured to generate clock cycles which are sent to the first and second electronic device, wherein the controller of the first electronic device is configured to set an estimated round-trip latency value at the first electronic device, wherein the estimated round-trip latency value is represented as a binary number, generate and sending, during a first period, a first test signal by the first electronic device to the second electronic device, wherein the first test signal comprises alternating first values and second values, wherein first and second values are sent at each clock cycle of the clock unit, saving by the first electronic device each first and second value of the first test signal for at least a duration that corresponds to the estimated round-trip latency value, receive a validating signal at the first electronic device, compare the validating signal with the first test signal sent during the first period, and determine if the estimated round-trip latency value is correct based on the comparing of the validating signal and the first test signal. The controller of the second electronic device may be configured to receive the first test signal at the second electronic device, and send, to the first electronic device, upon receiving the first test signal, a validating signal that is generated by the second electronic device and is based on the first test signal, wherein the validating signal comprises at least second values when second values from the first test signal are received.

In an embodiment comparing the validating signal with the first test signal comprises determining, at a time of receiving a second value from the validating signal, if the first test signal that is sent at a time that is one estimated round-trip latency value earlier than the receiving of the second value of the validating signal comprises a first or second value, and comparing the determined first or second value of the first test signal with the second value of the validating signal.

In an embodiment saving by the first device each first and second value of the first test signal for at least a duration that corresponds to the estimated round-trip latency value comprises storing each first and second value from the first test signal in a shift register, wherein the shift register has a length that corresponds to the estimated round-trip latency value, and when the received validating signal comprises the second value, the method further comprises determining, upon registering that the received validating signal comprises the second value, if an output of the shift register is a first or second value, and comparing the determined first or second value of the output of the shift register with the second value of the validating signal.

In an embodiment determining if the estimated round-trip latency value is correct further comprises determining, based upon at least the second values of the validating signal corresponding to the sending of the second values of the first test signal, that a least significant bit of the estimated round-trip latency value is correct.

In an embodiment the method further comprises flipping the least significant bit of the estimated round-trip latency value if the least significant bit of the estimated round-trip latency value is incorrect.

In an embodiment the steps of comparing the validating signal with the first test signal is repeated for a predetermined number of times, wherein each time that during a determination step the second value of the validating signal corresponds to the second value of the first test signal represents a correct measurement, and wherein determining if the estimated round-trip latency value is correct further comprises determining a ratio corresponding to a number of correct measurements divided by the predetermined number of times, and determine that the least significant bit of the estimated round-trip latency value is correct if the ratio is above a predetermined threshold.

In an embodiment determining if the estimated round-trip latency value is correct determines if the estimated round-trip latency value is off by is a multiple of one clock cycle compared to an actual round-trip latency value.

In an embodiment the estimated round-trip latency value represents a latency measured in clock cycles.

In an embodiment the method further comprises generating and sending, during a second period, a second test signal by the first device to the second device, wherein the second test signal comprises first values and second values, wherein each second value is preceded by three first values.

In an embodiment determining if the estimated round-trip latency value is correct further comprises determining, based upon at least the second values of the validating signal corresponding to the sending of the second values of the first test signal, that a second-to-least significant bit of the estimated round-trip latency value is correct.

In an embodiment the method further comprises flipping the second-to-least significant bit if the second-to-least significant bit of the estimated round-trip latency value is incorrect.

In an embodiment determining if the estimated round-trip latency value is correct determines if the estimated round-trip latency value is off by a multiple of 2 clock cycles compared to an actual round-trip latency value.

In an embodiment the method further comprises generating and sending, during a third period, a third test signal by the first device to the second device, wherein the third test signal comprises first values and second values, wherein each second value is preceded by seven first values.

In an embodiment determining if the estimated round-trip latency value is correct further comprises determining, based upon at least the second values of the validating signal corresponding to the sending of the second values of the first test signal, that a third-to-least significant bit of the estimated round-trip latency value is correct.

In an embodiment the method further comprises flipping the third-to-least significant bit if the third-to-least significant bit of the estimated round-trip latency value is incorrect.

In an embodiment determining if the estimated round-trip latency value is correct determines if the estimated round-trip latency value is off by a multiple of 4 clock cycles compared to an actual round-trip latency value.

In an embodiment the method further comprises generating and sending for n=1 till N, during a n-th period, a n-th test signal by the first device to the second device, wherein the n-th test signal comprises first and second values, wherein each second value is preceded by two to the power n minus one times a first value, and repeating the generating and sending of the test signal wherein with each repetition the value of n is increased by one.

In an embodiment determining if the estimated round-trip latency value is correct determines if the estimated round-trip latency value is off by a multiple of two to the power n−1 clock cycles compared to an actual round-trip latency value.

In an embodiment the method further comprises stopping the repeating of the generating of the test signal based on the distance between the first device and second device and the speed of light.

In an embodiment the test signals and/or validating signals are optical signals, and wherein preferably the first and second values are early, late or vacuum time bin qubits.

In an embodiment the clock signal is a Manchester encoded clock signal, and preferably wherein the validating signal is encoded onto the clock signal.

In an embodiment the estimated round-trip latency value is at least partly set based on a distance between the first and second device divided by the speed of light.

In a further aspect the disclosure relates to a quantum communication network comprising a system according to any one foregoing embodiments.

In a further aspect the disclosure relates to a computer program configured to for executing the method steps according to any one of the foregoing embodiments.

BRIEF DESCRIPTION OF THE DRAWINGS

Reference will now be made in detail to exemplary embodiments, examples of which are illustrated in the accompanying drawings, wherein like reference numerals refer to the like elements throughout. Exemplary embodiments are described below with reference to the figures.

DETAILED DESCRIPTION OF ILLUSTRATIVE EMBODIMENTS

It is to be understood that the terminology used herein is for the purpose of describing particular embodiments only, and is not intended to be limiting, since the scope of the present disclosure will be determined by the appended claims.

Furthermore, unless defined otherwise, all technical and scientific terms used herein have the same meaning as commonly understood by one of ordinary skill in the art to which this invention belongs. Still, certain elements are defined below for the sake of clarity and ease of reference.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual exemplifying embodiments described and illustrated herein has discrete components and features which may be readily separated from or combined with the features of any of the other several exemplifying embodiments. Any recited method can be carried out in the order of events recited or in any other order which is logically possible.

Figure 1:
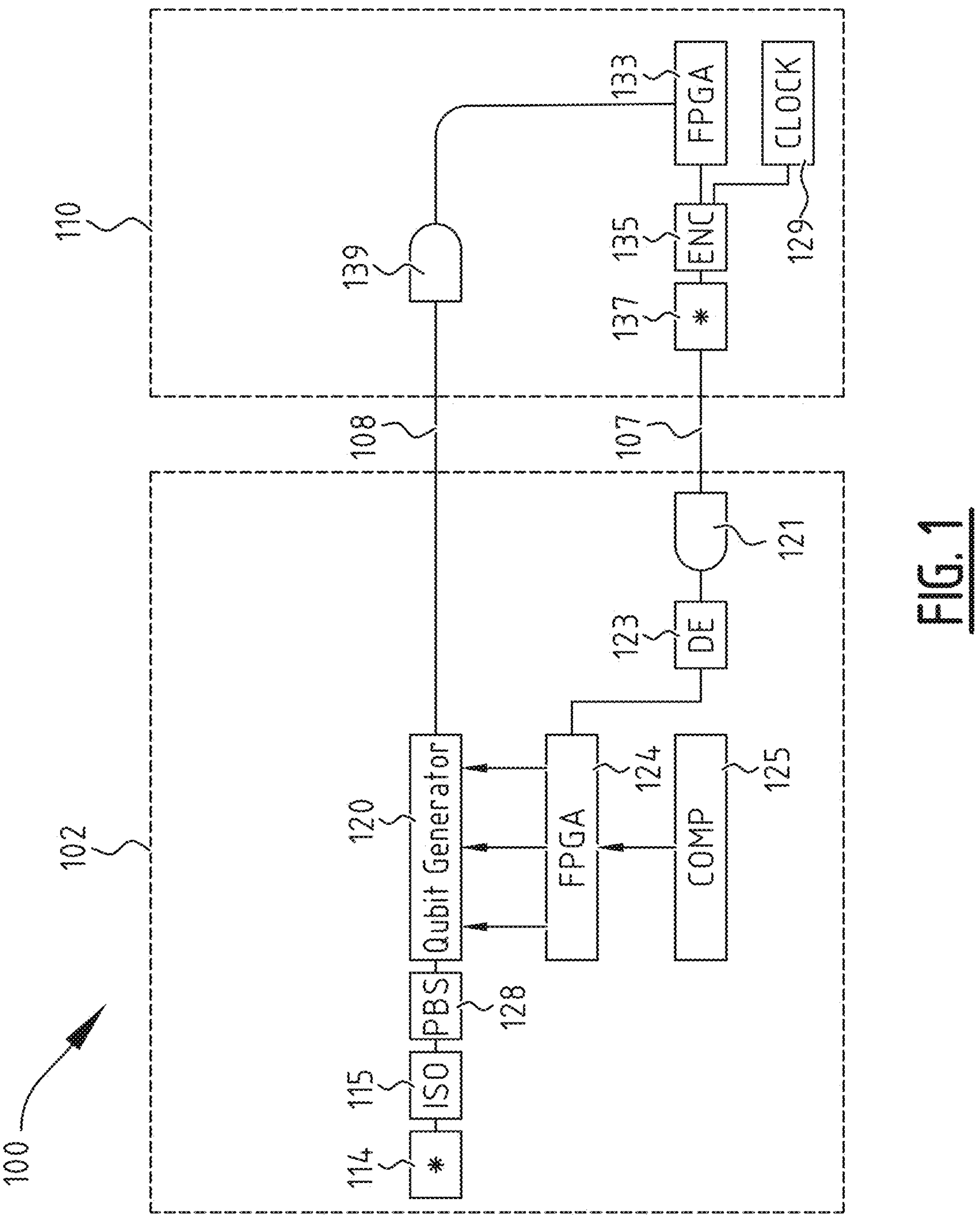
FIG. 1 shows an example of a QKD system comprising a system for determining the round-trip latency.

FIG. 1 depicts an example of a QKD system comprising a system determining the round-trip latency according to an embodiment of the disclosure. The system 100 comprises a first qubit module 102 and a receiver node 110. First qubit module 102 comprises a laser unit 114, in the illustrated example a distributed feedback laser, for supplying a continuous light field. After the laser unit 114 an isolator 115 is positioned for stabilising the laser light. After the isolator the laser light is split by a polarizing beam splitter PBS 128. A first arm coming from PBS 128 goes to a qubit generation device 120 that receives qubit state information from a field programmable gate array FPGA 124. Qubit generation device 120 may for example comprise various intensity modulators, phase modulators, variable optical attenuators and/or isolators to obtain the desired properties for the qubits. The qubit made by qubit generation device 120 is then sent from first qubit module 102 over optical fiber 108 to receiver node 110.

The qubit that is sent over optical fiber 108 is received at a qubit measurement device 139, wherein a qubit projection measurement can be performed on the qubit. These detections of the qubit projection measurement are sent to FPGA 133 of receiver node 110. The result of the measurement is encoded onto a clock signal using a Manchester encoder 135. The clock signal of clock 129 is used to pulse a laser unit 137, in the illustrated example embodied as a DFB laser, thereby creating an optical clock signal. This clock signal is sent to first and second qubit module 102, 104.

The optical clock signal is received by first quantum module 102 at photodiode 121 the resulting electrical signal is decoded by Manchester decoder DE 123. The decoding gives an electrical clock signal that synchronizes the entire system. Next to this, the decoding gives information to the first quantum module 102 on the successful projection measurement at the receiver node 110. This information enters the FPGA 124 of first qubit module 102. Subsequently first qubit module 102 backtracks what qubit info corresponds with which measurement result, as there is a delay between sending the qubit and getting the measurement result from receiver node 110.

Figure 2:
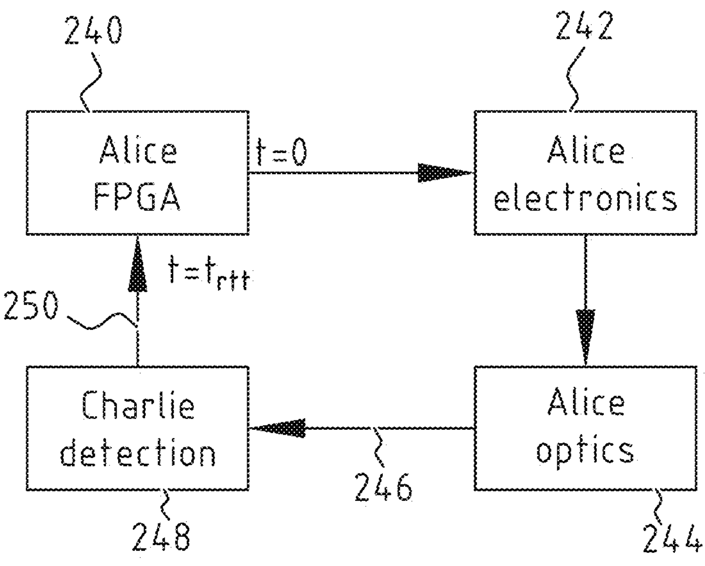
FIG. 2 shows an example of the round-trip latency of a system.

FIG. 2 shows a schematic example of the electronic hardware. At time t=0 pulse information is generated by a field programmable gate array (FPGA) 240 from Alice. This pulse information from the FPGA is sent to the electronics 242 of Alice. The electronics 242 of Alice may be pulse generator boards to create the appropriate electrical pulses. The electrical pulses are then sent to the optics 244 of Alice that may comprise intensity modulators for shaping the electrical pulses and for creating decoy states. The optics form the optical pulses based on the electrical pulses that were sent from the electronics of Alice. These optical pulses travel through optical fiber 246 to the detector 248 of Bob. Bob detects these optical pulses and sends detection information back to Alice. The detection information is sent back with optical pulses through optical fiber 250. The time of the arrival of the optical pulses at Alice is characterized as $t=t_{rtt}$ (round-trip time). The optical pulses may be early, late or vacuum state time bin qubits.

Figure 3:
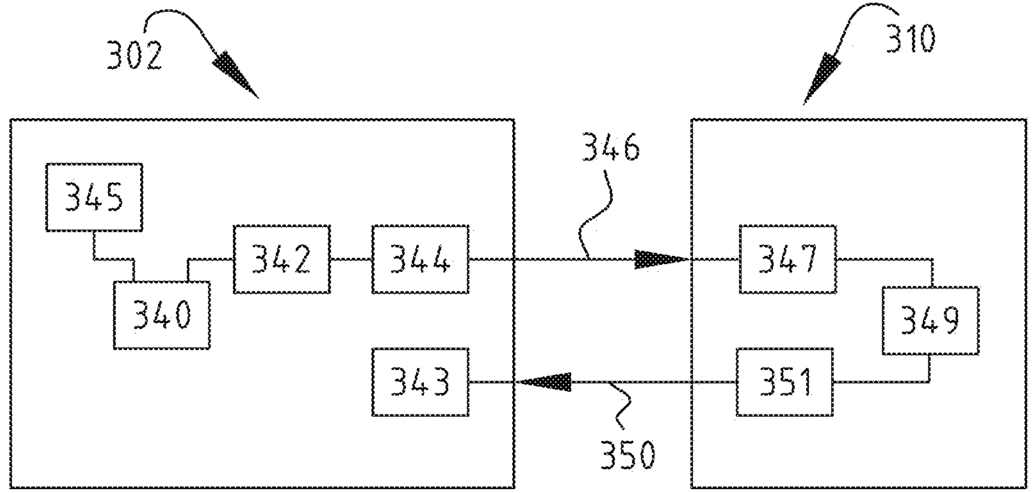
FIG. 3 shows a detailed example of a system according to the disclosure.

FIG. 3 shows Alice 302 being remotely located from Bob 310. Distance D of optical fibers 346, 350 between Alice 302 and Bob 310 may not be precisely known, for example because of thermal expansion or contraction of the optical fibers 346, 350. Therefore the round-trip latency of a signal traveling from Alice 302 to Bob 310 and back to Alice 302 is also unknown. Alice 302 can send first or second values to Bob 310. This can be done with the FPGA 340, electronics 342 and optics 344, as explained in FIGS. 1 and 2. These first or second values may respectively be a vacuum state and an early state of a time-bin light pulse configuration. It is clear to the skilled person that any information carrier that can comprise two signals which are distinguishable is suitable for the present disclosure. It is for example possible that the first value is an early state and the second value is a late state. Furthermore, the first and second values are not limited to time-bin light pulses. It may be possible that other information carriers, such as qubits, are used to send a first and second value from Alice to Bob. In the illustrated embodiment, the first and second values are sent to detector 347 of Bob 310. The detector sends the detection information to controller 349 of Bob 310. The controller 349 then sends a validating signal command to optics 351 of Bob 310 that drives optics 351 to send the validating signal over optical fiber 350 towards receiver 343 of Alice 302.

In an embodiment, the validating signal send over optical fiber 350 may be a clock signal whereon the detections information of the pulses detected at detector 347 are encoded. For example, optics 351 may be driven by Manchester encoder 135 which has as its input clock 129 and FPGA 133 of Bob 110 as explained in FIG. 1.

Figure 4A:
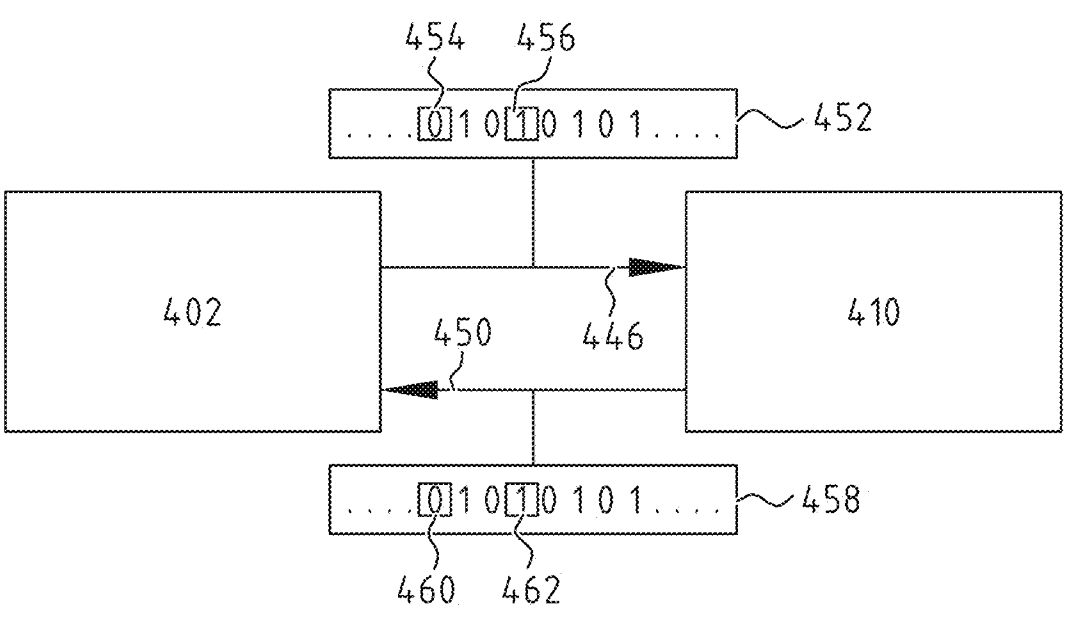
FIGS. 4A-C show examples of the method according to the disclosure.
Figure 4B:
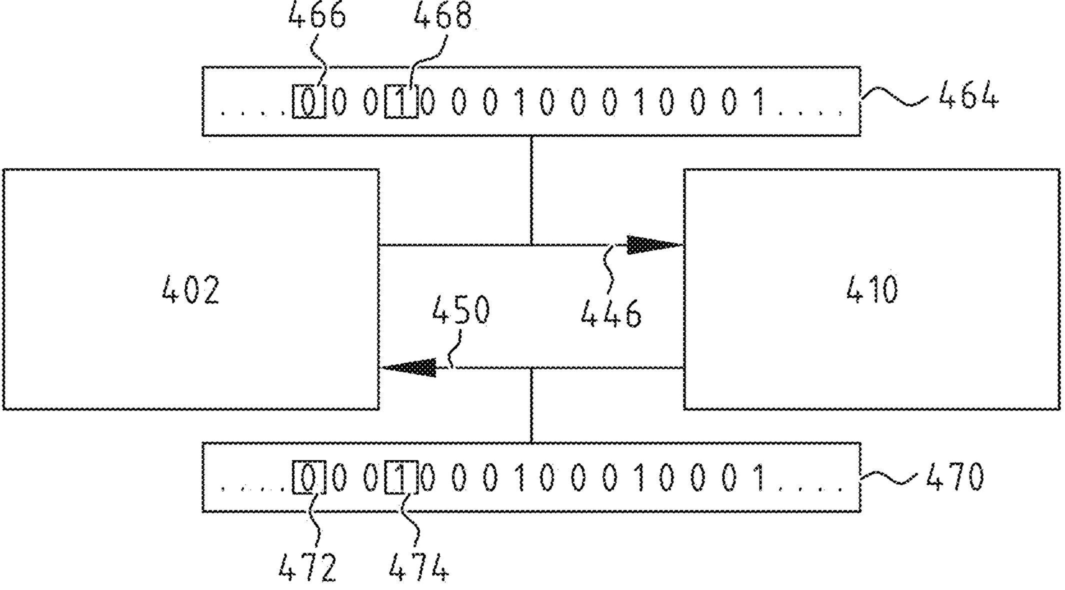
Figure 4C:
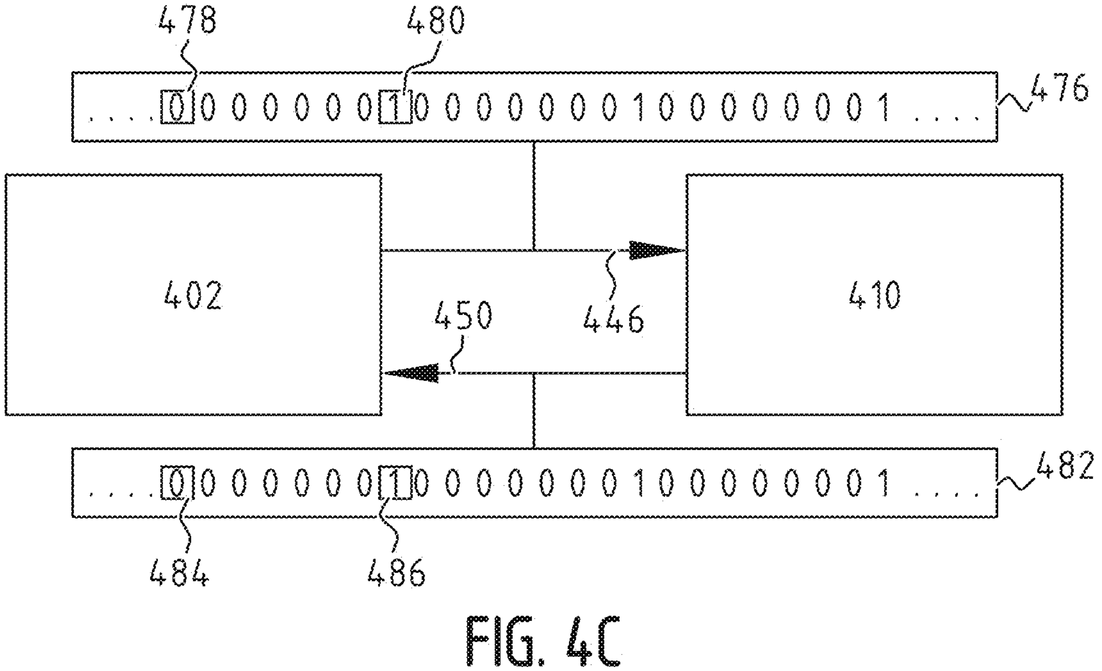

FIGS. 4A-C show an example of the method according to the invention. Alice 402 sends during a first period a first test signal 452 through optical fiber 446 to Bob 410. First test signal 452 comprises first values 454 and second values 456, in this example illustrated as 0's and 1's respectively. The first and second signals 454, 456 are repeatedly send in an alternating manner. Alice 402 may save each of the first and second values 454, 456 in memory 345. Memory 345 may be embodied as a shift register. In particular, Alice 402 memorizes at what specific clock cycle a first or second value 454, 456 has been sent. This can be achieved by putting each first and second value in the shift register. Alice 402 may send the first and second values 454, 456 at each clock cycle of the clock system, and memorizes for each clock cycle if she sends a first value 454 or a second value 456. The saving or memorizing of the first and second values is done for at least a duration that corresponds to the estimated round-trip latency value.

When first test signal 452 arrives at Bob 410, Bob 410 detects the first and second values 454, 456 of the first test signal 452. Bob 410 sends back a validating signal 458 to Alice 402 through optical fiber 450. In an embodiment the validating signal 458 is sent from Bob 410 to Alice 402 directly upon receiving first test signal 452. Every time Bob 410 detects a second value 456 of first test signal 452, validating signal 458 sends back the detection information from Bob 410 to Alice 402. This validating signal 458 can be any signal, as long as Alice is configured to recognize how the validating signal 458 encodes a detection of the second value 456 of the first test signal 452. In the illustrated embodiment, the validating signal 458 comprises first values 460 and second values 462, wherein a first value 460 of the validating signal 458 corresponds to a detection of a first value 454 of the first test signal 452 and a second value 462 of the validating signal 460 corresponds to a detection of a second value 456 of the first test signal 452. It is clear for the skilled person that it is also possible for Bob 410 to only send second values 462 that correspond to a detection of a second value 456 of the first test signal 452 to Alice 402 and refrain from sending the first values 460. In an embodiment the validating signal 458 is sent to Bob 410 with a Manchester encoded clock signal.

The validating signal 458 arrives at Alice 402. Alice 402 has to link the detections from the validating signal 458 to first or second values 454, 456 of the first test signal 452 that were sent by Alice 402 at an earlier time. This can be done by Alice 402 setting an estimated round-trip latency value. The estimated round-trip latency value is a number of clock cycles of the clock unit. This estimated round-trip latency value is represented as a binary number. At the time of setting the first round-trip latency it is not known if the estimated round-trip latency value is the actual round-trip latency value as explained in FIG. 2. When a second value from the validating signal 458 is received, it may be determined, upon registering that the validating signal comprises the second value, if an output of the shift register is a first or second value. As the shift register has a length that corresponds to the estimated round-trip latency value, the determined first or second value of the output of the shift register corresponds to a first or second value of the first test signal 452 that was sent an estimated round-trip latency value earlier than the clock cycle on which the second value of the validating signal 458 has been received. In this way, Alice 402 can identify which first or second values 454, 456 which were sent by Alice 402 correspond to the second values from the validating signal 458 received from Bob 410.

In case the second values 462 from the validating signal 458 are linked to second values 456 from the first test signal 452, the FPGA 340 of Alice 402 may determine that the least significant bit of the estimated round-trip latency value is correct. In case the second values 462 from the validating signal 458 are linked to first values 454 from the first test signal 452, the FPGA 340 of Alice 402 may determine that the least significant bit of the estimated round-trip latency value is incorrect. If the least significant bit of the first round-trip latency is determined to be incorrect, the FGPA 340 of Alice 402 may flip the least significant bit. Flipping a bit in the present invention means changing the value of a bit from either 0 to 1 or from 1 to 0. For example, if the least significant bit of the estimated round-trip latency value is 0, and the second values 462 of the validating signal 458 are linked to first values 454 from the first test signal 452, the least significant bit is changed to 1. The determination of the least significant bit being correct or incorrect can be understood as Alice 402 determining if the actual round-trip latency is a multiple of two clock cycles.

In an embodiment, Alice sends during a first period the first test signal 452 with alternating first and second values 454, 456, and counts the amount of times the second values 462 of the validating signal are linked to a second value 456 of the test signal. If a ratio between the number of times that a correct link between the second values 456, 462 is determined versus the number of times that an incorrect link is determined is below a lower predetermined threshold, the controller of Alice may determine that the least significant bit is incorrect and flip the least significant bit. If a ratio between the number of times that a correct link is determined versus the number of times that an incorrect link is determined is above a higher predetermined threshold, the controller of Alice may determine that the least significant bit is correct.

During a second time (FIG. 4B), Alice 402 may send a second test signal 464 through optical fiber 446 that also comprises first values 466 and second values 468. The first and second values 466, 468 are sent with each second value 468 being preceded by three first values 466 repeatedly. When second test signal 464 arrives at Bob 410, Bob 410 detects the first and second values 466, 468 of the second test signal 464. Bob 410 sends back a validating signal 470 to Alice 402 through optical fiber 450. Every time Bob 410 detects a second value 468 of second test signal 464, validating signal 470 sends back the detection information from Bob 410 to Alice 402. In the illustrated embodiment, the validating signal 470 comprises first values 472 and second values 474, wherein a first value 472 of the validating signal 470 corresponds to a detection of a first value 466 of the second test signal 464 and a second value 474 of the validating signal 470 corresponds to a detection of a second value 468 of the second test signal 464.

Alice 402 links the detections from the validating signal 470 to first or second values 466, 468 of the second test signal 464 that were sent by Alice 402 at an earlier time determining which first or second value is output from the shift register. Alice 402 may then check if the second values 468 from the second test signal 464 correspond to the second values 474 from validating signal 470 sent by Bob 410. Alice 402 may then determine if the second-to-least significant bit of the estimated round-trip latency value is correct. The determination of the least significant bit being correct or incorrect can be understood as Alice 402 determining if the estimated round-trip latency is off by a multiple of two clock cycles compared to the actual round-trip latency.

During a third time (FIG. 4B), Alice 402 may send a third test signal 476 through optical fiber 446 that also comprises first values 478 and second values 480. The first and second values 478, 480 are sent with each second value 480 being preceded by seven first values 478 repeatedly. When third test signal 476 arrives at Bob 410, Bob 410 detects the first and second values 478, 480 of the third test signal 476. Bob 410 sends back a validating signal 482 to Alice 402 through optical fiber 450. Every time Bob 410 detects a second value 480 of third test signal 476, validating signal 482 sends back the detection information from Bob 410 to Alice 402. In the illustrated embodiment, the validating signal 482 comprises first values 484 and second values 486, wherein a first value 484 of the validating signal 482 corresponds to a detection of a first value 478 of the third test signal 476 and a second value 486 of the validating signal 482 corresponds to a detection of a second value 480 of the third test signal 476.

Alice 402 links the detections from the validating signal 482 to first or second values 478, 480 of the third test signal 476 that were sent by Alice 402 at an earlier time by subtracting the estimated round-trip latency value. Alice 402 may then check if the second values 480 from the third test signal 476 correspond to the second values 486 from validating signal 482 sent by Bob 410. Alice 402 may then determine if the second-to-least significant bit of the first round-trip latency is correct. The determination of the second-to-least significant bit being correct or incorrect can be understood as Alice 402 determining if the estimated round-trip latency is off by a multiple of four clock cycles compared to the actual round-trip latency.

The method according to the present disclosure further comprises repeating the steps that are disclosed in FIGS. 4A-C, with the difference that in each subsequent test signal the number of first values preceding the second values is increased according to the formula $2^n-1$ first values preceding a second value for the $n^{th}$ test signal. In this way, the $n^{th}$ test signal determines if the estimated round-trip latency is off by a multiple of $2^{n-1}$ clock cycles compared to the actual round-trip latency. These steps can be repeated until a certain upper round-trip latency estimation threshold has been reached. In case the testing signal and validating signal are optical signals, the upper round-trip latency estimation threshold may be determined based on the distance between Alice 402 and Bob 410 multiplied by a certain factor, for example 10, divided by the speed of light.

Figures 5A, 5B, 5C:
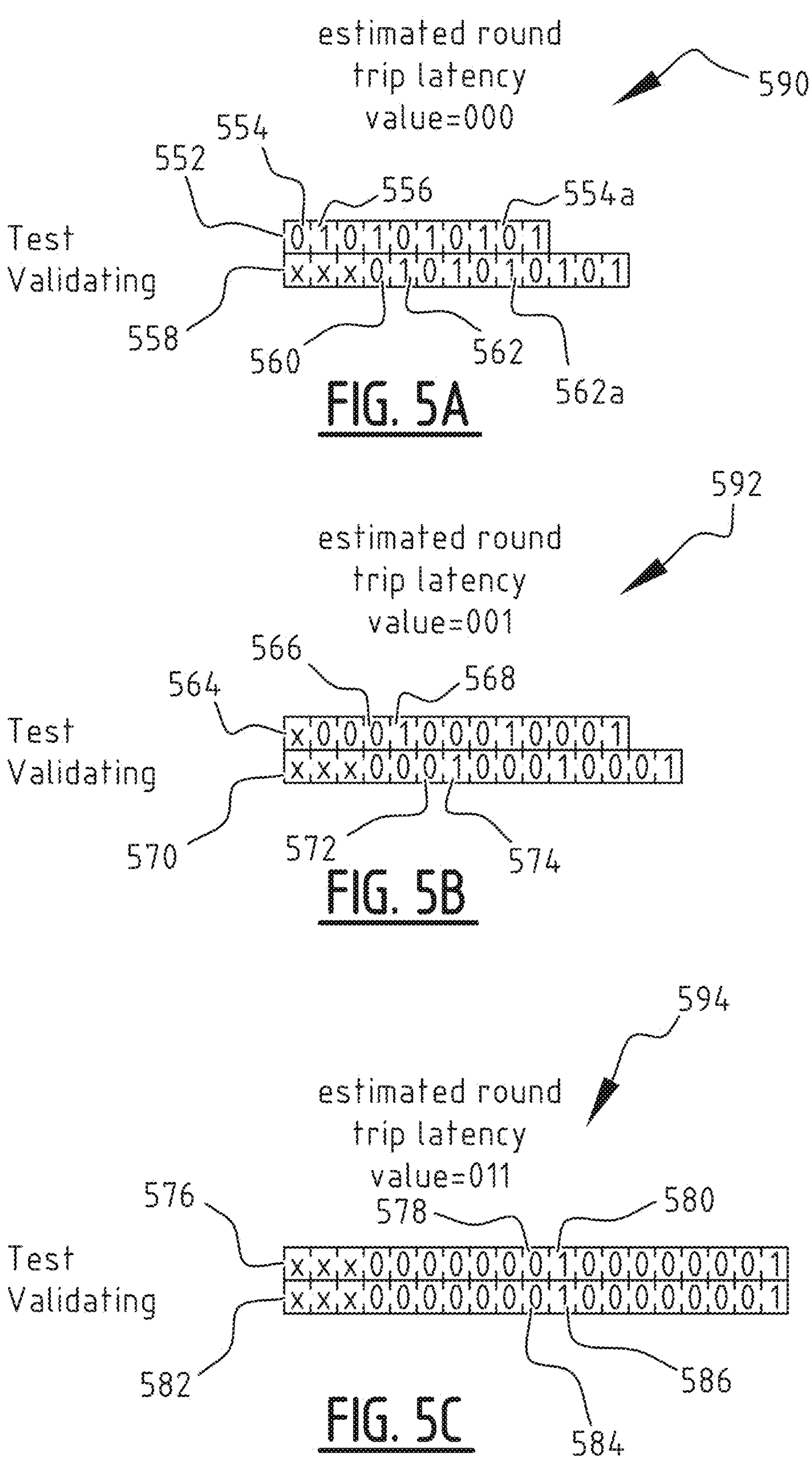
FIGS. 5A-C show an illustration of the method according to the disclosure.

FIG. 5 depicts a simplified example of the method of the present invention. It is noted that this example is only for conceptual illustrative purposes, and does not necessarily correspond to a working embodiment of the invention.

In the following situations A, B and C the actual round-trip latency value is 3 clock cycles, which can be represented by binary number 011. In situation A, an estimated round-trip latency value 590 is set. The estimated round-trip latency value 590 is zero clock cycles and is represented as the binary number 000. First testing signal 552 is sent by Alice 402 and validating signal 558 is received by Alice 402. First test signal 552 comprises alternating first values 554 and second values 556. Validating signal 558 comprises alternating first values 560 and second values 562. The actual round-trip latency value of three clock cycles is represented by the three x's in front of validating signal 558.

As Alice 402 assumes that there is no latency, Alice 402 will link every first or second value 554, 556 that is sent at a certain clock cycle to the incoming first or second value 560, 562 at that same certain clock cycle. In other words, the estimated sent time value is equal to the received time value. The first and second values 554, 556, 560, 562 that are linked to each other by Alice 402 are put directly above each other. For example, first value 554*a* is linked to second value 562*a*. As can be seen in situation A, first values 554 are linked to second values 562 and second values 556 are linked to first values 560. Therefore, Alice 402 determines that the least significant bit of the estimated round-trip latency value 590 is incorrect, and the bit is flipped.

In situation B the estimated round-trip latency value 592 is one clock cycle, represented by binary number 001. The estimated round-trip latency value 592 of one clock cycle is represented by the one x in front of test signal 564. The first and second values 566, 568, 572, 574 from second test signal 564 and validating signal 570 that are linked to each other by Alice 402 are put directly above each other. As can be seen in situation B, first values 566 are still linked to second values 572 and second values 568 are still linked to first values 572. Therefore, Alice 402 determines that the second-to-least significant bit of the estimated round-trip latency value 592 is incorrect, and the bit is flipped.

In situation C the estimated round-trip latency value 594 is three clock cycles, represented by binary number 011. The estimated round-trip latency value 594 of three clock cycles is represented by three x's in front of test signal 576. The first and second values 578, 580, 584, 586 of third test signal 576 and validating signal 582 that are linked to each other by Alice 402 are put directly above each other. As can be seen in situation C, first values 578 are linked to first values 584 and second values 580 are linked to first values 586. Therefore, Alice 402 determines that the third-to-least significant bit of the estimated round-trip latency value 594 is correct.

Every subsequent test signal, for example with a second value being preceded by fifteen first values, will result in a correct linking of first values with first values and second values with second values. After a predetermined upper latency threshold, the method may end with sending testing signals and determine that the actual round-trip latency is three clock cycles.

Figure 6:
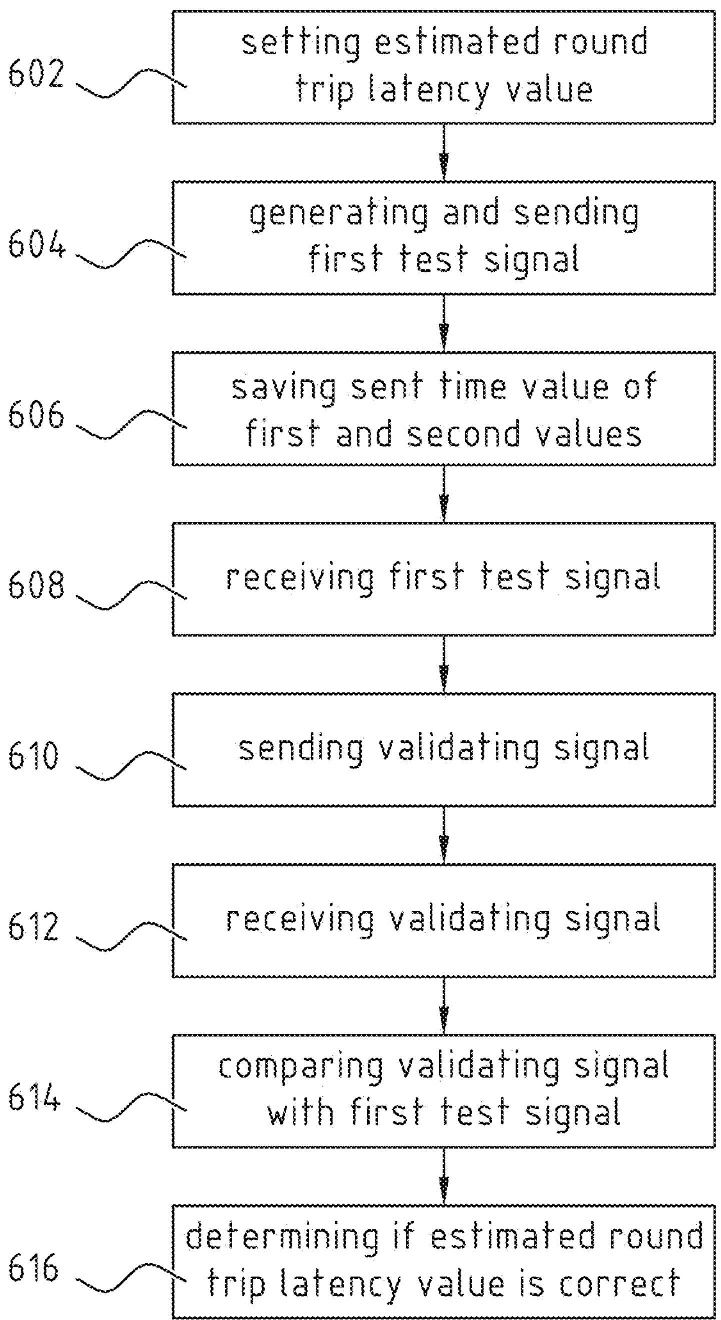
FIG. 6 shows an example of a method for determining the round-trip latency.

FIG. 6 depicts a method according to the present disclosure. In step 602 a first estimated round-trip latency value is set by the first device, wherein the estimated round-trip latency value is represented as a binary number. In step 604 a first test signal is generated and send by the first device to the second device, during a first period, wherein the first test signal comprises alternating first values and second values, wherein first and second values are sent at each clock cycle of the clock unit. In step 606 a sent time value of each first and second value of the first test signal is saved by the first device. In step 608 the first test signal is received at the second device. In step 610 a validating signal that is generated by the second device and is based on the first test signal is sent, by the second device to the first device, upon receiving the first test signal, wherein the validating signal comprises at least second values when second values from the first test signal are received. In step 612 the validating signal is received at the first device at a received time value. In step 614 the validating signal is compared with the first test signal sent during the first period. In step 616 it is determined if the estimated round-trip latency value is correct based on the comparing of the validating signal and the first test signal.

Figure 7:
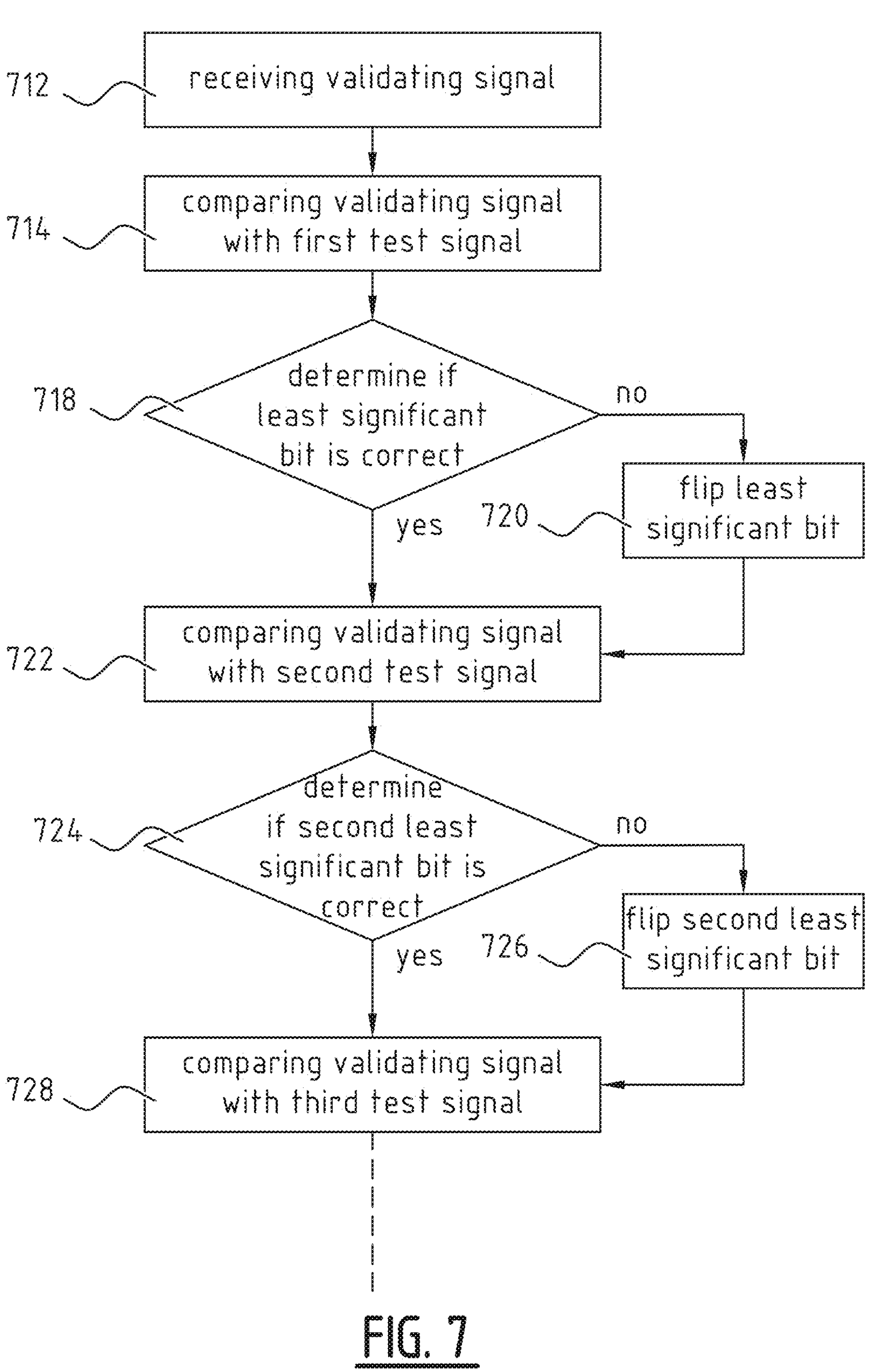
FIG. 7 shows a further example of a method for determining the round-trip latency.

FIG. 7 depicts a further method according to the present disclosure. In step 712 the validating signal is received at the first device at a received time value. In step 714 the validating signal is compared with the first test signal sent during the first period. In step 718 it is determined if the least significant bit is correct. If the least significant bit is not correct, the least significant bit is flipped in step 720. After flipping the least significant bit, or after determining that the least significant is correct, the validating signal is compared with the second test signal sent during the second period in step 722. In step 724 it is determined if the second-to-least significant bit is correct. If the second-to-least significant bit is not correct, the least significant bit is flipped in step 726. After flipping the least significant bit, or after determining that the least significant is correct, the validating signal is compared with the third test signal sent during the second period in step 728.

The present disclosure is by no means limited to the above described preferred embodiments thereof. The rights sought are defined by the following claims within the scope of which many modifications can be envisaged.

Although the present invention has been described with reference to preferred embodiments, workers skilled in the art will recognize that changes may be made in form and detail without departing from the spirit and scope of the invention.

What is claimed is:

1. A method for determining a round-trip latency of a communication channel in a quantum communication system between a first device located at a first location and a second device located at a second location that is remote from the first location, wherein the communication system comprises a clock unit configured to generate clock cycles, comprising:

setting an estimated round-trip latency value by the first device, wherein the estimated round-trip latency value is represented as a binary number and represents a latency measured in clock cycles of the clock unit;

generating and sending, during a first period, a first test signal by the first device to the second device, wherein the first test signal comprises alternating first values and second values, wherein first and second values are sent at each clock cycle of the clock unit;

saving by the first device each first and second value of the first test signal for at least a duration that corresponds to the estimated round-trip latency value;

receiving the first test signal at the second device;

sending, by the second device to the first device, upon receiving the first test signal, a validating signal that is generated by the second device and is based on the first test signal, wherein the validating signal comprises at least second values when second values from the first test signal are received;

receiving the validating signal at the first device;

comparing the validating signal with the first test signal sent during the first period; and determining if the estimated round-trip latency value is correct based on the comparing of the validating signal and the first test signal.

2. The method according to claim 1, wherein comparing the validating signal with the first test signal comprises:

determining, at a time of receiving a second value from the validating signal, if the first test signal that was sent at a time that is one estimated round-trip latency value earlier than the receiving of the second value of the validating signal comprises a first or second value; and comparing the determined first or second value of the first test signal with the second value of the validating signal.

3. The method according to claim 1, wherein:

saving by the first device each first and second value of the first test signal for at least a duration that corresponds to the estimated round-trip latency value comprises storing each first and second value from the first test signal in a shift register, wherein the shift register has a length that corresponds to the estimated round-rip latency value, and when the received validating signal comprises the second value, the method further comprises:

determining, upon registering that the received validating signal comprises the second value, if an output of the shift register is a first or second value; and comparing the determined first or second value of the output of the shift register with the second value of the validating signal.

4. The method according to claim 1, wherein determining if the estimated round-trip latency value is correct further comprises:

determining, based upon at least the second values of the validating signal corresponding to the sending of the second values of the first test signal, that a least significant bit of the estimated round-trip latency value is correct; and flipping the least significant bit of the estimated round-trip latency value if the least significant bit of the estimated round-trip latency value is incorrect.

5. The method according to claim 1, wherein the steps of comparing the validating signal with the first test signal is repeated for a predetermined number of times, wherein each time that during a determination step the second value of the validating signal corresponds to the second value of the first test signal represents a correct measurement, and wherein determining if the estimated round-trip latency value is correct further comprises:

determining a ratio corresponding to a number of correct measurements divided by the predetermined number of times; and determine that the least significant bit of the estimated round-trip latency value is correct if the ratio is above a predetermined threshold.

6. The method according to claim 1, wherein determining if the estimated round-trip latency value is correct determines if an actual round-trip latency value is a multiple of 2 clock cycles.

7. The method according to claim 1, further comprising:

generating and sending, during a second period, a second test signal by the first device to the second device, wherein the second test signal comprises first values and second values, wherein each second value is preceded by three first values, or wherein determining if the estimated round-trip latency value is correct further comprises:

determining, based upon at least the second values of the validating signal corresponding to the sending of the second values of the second test signal, that a second-to-least significant bit of the estimated round-trip latency value is correct; or wherein determining if the estimated round trip latency value is correct determines if the estimated round trip latency value is off by a multiple of a clock cycles compared to an actual round trip latency value; or flipping the second-to-least significant bit if the second-to-least significant bit of the estimated round-trip latency value is incorrect.

8. The method according to claim 1, further comprising:

generating and sending, during a third period, a third test signal from the first device to the second device, wherein the third test signal comprises first values and second values, wherein each second value is preceded by seven first values; or wherein determining if the estimated round trip latency value is correct further comprises:

determining, based upon at least the second values of the validating signal corresponding to the sending of the second values of the third test signal, that a third-to-least significant bit of the estimated round trip latency value is correct; or wherein determining if the estimated round trip latency value is correct determines if the estimated round trip latency value is off by a multiple of 4 clock cycles compared to an actual round trip value latency value; or flipping the third-to-least significant bit if the third-to-least significant bit of the estimated round-trip latency value is incorrect.

9. The method according to claim 1, further comprising:

generating and sending for n=1 till N, during a n-th period, a n-th test signal by the first device to the second device, wherein the n-th test signal comprises first and second values, wherein each second value is preceded by two to a power n minus one times a first value;

repeating the generating and sending of the test signal wherein with each repetition the value of n is increased by one; or wherein determining if the estimated round trip latency value is correct determines if the estimated round trip latency value is off by a multiple of two to a power n−1 clock cycles compared to an actual round trip latency value, the method further comprising:

stopping the repeating of the generating of the test signal based on a distance between the first device and second device and a speed of light.

10. The method according to claim 1, wherein the test signals and/or validating signals are optical signals, and wherein the first and second values are early late or vacuum time bin qubits; or wherein the clock signal is a Manchester encoded clock signal, and wherein the validating signal is encoded onto the clock signal; or wherein the estimated round trip latency value is at least partly set based on a distance between the first and second device divided by the speed of light.

11. A quantum communication system for determining a round-trip latency between a first and a second location of a communication channel, comprising:

a first electronic device that is positioned at the first location comprising a controller and a signal circuit;

a second electronic device that is positioned at the second location that is remote from the first location comprising a controller and a signal circuit, a clock unit that is configured to generate clock cycles which are sent to the first and second electronic device, wherein the controller of the first electronic device is configured to:

set an estimated round-trip latency value by the first electronic device, wherein the estimated round-trip latency value is represented as a binary number and represents a latency measured in clock cycles of the clock unit;

generate and sending, during a first period, a first test signal by the first electronic device to the second electronic device, wherein the first test signal comprises alternating first values and second values, wherein first and second values are sent at each clock cycle of the clock unit;

save by the first electronic device each first and second value of the first test signal for at least a duration that corresponds to the estimated round-trip latency value;

receive a validating signal at the first electronic device;

compare the validating signal with the first test signal sent during the first period; and determine if the estimated round-trip latency value is correct based on the comparing of the validating signal and the first test signal, wherein the controller of the second electronic device is configured to:

receive the first test signal at the second electronic device; and send, to the first electronic device, upon receiving the first test signal, a validating signal that is generated by the second electronic device and is based on the first test signal, wherein the validating signal comprises at least second values when second values from the first test signal are received.

12. The system according to claim 11, wherein the controller of the first electronic device being configured to compare the validating signal with the first test signal comprises the controller of the first electronic device being configured to:

determine, at a time of receiving a second value from the validating signal, if the first test signal that is sent at a time that is one estimated round-trip latency value earlier than the receiving of the second value of the validating signal comprises a first or second value; and compare the determined first or second value of the first test signal with the second value of the validating signal.

13. The system according to claim 11, wherein:

the controller of the first electronic device being configured to save each first and second value of the first test signal for at least a duration that corresponds to the estimated round-trip latency value comprises the controller of the first electronic device being configured to store each first and second value from the first test signal in a shift register, wherein the shift register has a length that corresponds to the estimated round-trip latency value, and when the received validating signal comprises the second value, the controller of the first electronic device being further configured to:

determine, upon registering that the received validating signal comprises the second value, if an output of the shift register is a first or second value; and compare the determined first or second value of the output of the shift register with the second value of the validating signal.

14. The system according to claim 11, wherein the controller of the first electronic device being configured to determine if the estimated round-trip latency value is correct further comprises the controller of the first electronic device being configured to:

determine, based upon at least the second values of the validating signal corresponding to the sending of the second signal of the first test signal, that a least significant bit of the estimated round-trip latency value is correct; and flip the least significant bit of the estimated round-trip latency value if the least significant bit of the estimated round-trip latency value is incorrect.

15. The system according to claim 11, wherein the controller of the first electronic device being configured to compare the validating signal with the first test signal is repeated for a predetermined number of times, wherein each time during a determination the second value of the validating signal corresponds to the second value of the first test signal represents a correct measurement, and wherein the controller of the first electronic device being configured to determine if the estimated round-trip latency value is correct further comprises the controller of the first electronic device being configured to:

determine a ratio corresponding to a number of correct measurements divided by the predetermined number of times; and determine that the least significant bit of the estimated round-trip latency value is correct if the ratio is above a predetermined threshold; or wherein the controller of the first electronic device being configured to determine if the estimated round-trip latency value is correct determines if an actual round-trip latency value is a multiple of 2 clock cycles.

16. The system according to claim 11, wherein the controller of the first electronic device is further configured to:

generate and send, during a second period, a second test signal by the first electronic device to the second electronic device, wherein the second test signal comprises first values and second values, wherein each second value is preceded by three first values; or wherein the controller of the first electronic device is configured to determine if the estimated round trip latency value is correct further comprises:

determine, based upon at least the second values of the validating signal corresponding to the sending of the second values of the second test signal, that a second-to-least significant bit of the estimated round trip latency value is correct; or wherein the controller of the first electronic device being configured to determine if the estimated round-trip latency value is correct determines if the estimated round-trip latency value is off by a multiple of 2 clock cycles compared to an actual round-trip latency value; or wherein the controller of the first electronic device is configured to flip the second-to-least significant bit if the second-to-least significant bit of the estimated round-trip latency value is incorrect.

17. The system according to claim 11, wherein the controller of the first electronic device is further configured to:

generate and send, during a third period, a third test signal by the first electronic device to the second electronic device, wherein the third test signal comprises first values and second values, wherein each second value is preceded by seven first values; or wherein the controller of the first electronic device being configured to determine if the estimated round-trip latency value is correct further comprises:

determine, based upon at least the second values of the validating signal corresponding to the sending of the second values of the third test signal, that a third-to-least significant bit of the estimated round-trip latency value is correct; or wherein the controller of the first electronic device being configured to determine if the estimated round-trip latency value is correct determines if the estimated round-trip latency value is off by a multiple of 4 clock cycles compared to an actual round-trip latency value; or wherein the controller of the first electronic device is further configured to flip the third-to-least significant bit if the third-to-least significant bit of the estimated round-trip latency value is incorrect.

18. The system according to claim 11, wherein the controller of the first electronic device is further configured to:

generate and sending, for n=1 till N, during a n-th period, a n-th test signal by the first electronic device to the second electronic device, wherein the n-th test signal comprises first and second values, wherein each second value is preceded by two to a power n minus one times a first value;

repeat the generating and sending of the test signal wherein with each repetition the value of n is increased by one; or wherein the controller of the first electronic device being configured to determine if the estimated round trip latency value is correct determines if the estimated round trip latency value is off by a multiple of two to the power n−1 clock cycles compared to an actual round trip latency value; or wherein the controller of the first electronic device is further configured to:

stop the repeating of the generating of the test signal based on a distance between the first electronic device and second electronic device and a speed of light.

19. The system according to claim 11, wherein the test signals and/or validating signals are optical signals, and wherein the first and second values are early, late or vacuum time bin qubits; or wherein the clock signal is a Manchester encoded clock signal, and wherein the validating signal is encoded onto the clock signal; or wherein the estimated round-trip latency value is at least partly set based on a distance between the first and second electronic device divided by a speed of light.

20. A non-transitory computer readable medium having instructions which when executed by a quantum communication system execute a method for determining a round-trip latency of a communication channel in a quantum communication system between a first device located at a first location and a second device located at a second location that is remote from the first location, wherein the communication system comprises a clock unit configured to generate clock cycles, comprising:

setting an estimated round-trip latency value by the first device, wherein the estimated round-trip latency value is represented as a binary number and represents a latency measured in clock cycles of the clock unit;

generating and sending, during a first period, a first test signal by the first device to the second device, wherein the first test signal comprises alternating first values and second values, wherein first and second values are sent at each clock cycle of the clock unit;

saving by the first device each first and second value of the first test signal for at least a duration that corresponds to the estimated round-trip latency value, receiving the first test signal at the second device;

sending, by the second device to the first device, upon receiving the first test signal, a validating signal that is generated by the second device and is based on the first test signal, wherein the validating signal comprises at least second values when second values from the first test signal are received;

receiving the validating signal at the first device;

comparing the validating signal with the first test signal sent during the first period; and determining if the estimated round-trip latency value is correct based on the comparing of the validating signal and the first test signal.

* * * * *